United States Patent
Koch

(10) Patent No.: US 7,542,624 B1
(45) Date of Patent: Jun. 2, 2009

(54) WINDOW-BASED METHOD FOR APPROXIMATING THE HAUSDORFF IN THREE-DIMENSIONAL RANGE IMAGERY

(75) Inventor: Mark W. Koch, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 707 days.

(21) Appl. No.: 11/238,609

(22) Filed: Sep. 29, 2005

Related U.S. Application Data

(60) Provisional application No. 60/688,886, filed on Jun. 8, 2005.

(51) Int. Cl.
*G06K 9/00* (2006.01)
*G06K 9/52* (2006.01)
*G06K 9/62* (2006.01)
*G06K 9/32* (2006.01)

(52) U.S. Cl. .................. 382/294; 382/106; 382/206; 382/209

(58) Field of Classification Search .............. 382/106, 382/115, 118, 154
See application file for complete search history.

(56) References Cited

U.S. PATENT DOCUMENTS

| | | | | |
|---|---|---|---|---|
| 4,560,977 | A * | 12/1985 | Murakami et al. | 341/118 |
| 5,999,653 | A * | 12/1999 | Rucklidge et al. | 382/227 |
| 6,801,662 | B1 * | 10/2004 | Owechko et al. | 382/224 |
| 6,807,286 | B1 * | 10/2004 | Krumm et al. | 382/103 |
| 6,999,606 | B1 * | 2/2006 | Frischholz | 382/18 |
| 7,328,111 | B2 * | 2/2008 | Porikli | 702/19 |
| 2002/0186875 | A1 * | 12/2002 | Burmer et al. | 382/133 |
| 2005/0135664 | A1 * | 6/2005 | Kaufhold et al. | 382/131 |

OTHER PUBLICATIONS

Frischholz, Robert "Methods and System for Recognizing People With Model-Based Face Detection", Apr. 13, 2000, WO00/21021.*
Huttenlocher, Daniel, Rucklidge, William, "A Multi-Resolution Technique for Comparing Images Using Hausdorff Distance", "Computer Vision and Pattern Recognition, 1993. Proceedings CVPR '93., 1993 IEEE Computer Society Conference on", Jun. 15-17, 1993, pp. 705-706.*
Daniel P. Huttenlocher, "View-Based Recognition Using an Eigenspace Approximation to the Hausdorff Measure," IEEE Transactions on Pattern Analysis and machine Intelligence, vol. 21, No. 9, Sep. 1999, 951-955.
Daniel, P. Huttenlocher, "Comparing Images Using the Hausdorff Distance," IEEE Transactions on Pattern Analysis and machine Intelligence, vol. 15, No. 9, Sep. 1993, 850-863.
Trina D. Russ, "A 2D Range Hausdorff Approach for 3D Face Recognition," Submitted to IEEE Face-recognition Grande Challenge Experiment Workshop 2005, pp. 1-8.

* cited by examiner

*Primary Examiner*—Matthew C Bella
*Assistant Examiner*—Gandhi Thirugnanam
(74) *Attorney, Agent, or Firm*—Kevin W. Bieg

(57) ABSTRACT

One approach to pattern recognition is to use a template from a database of objects and match it to a probe image containing the unknown. Accordingly, the Hausdorff distance can be used to measure the similarity of two sets of points. In particular, the Hausdorff can measure the goodness of a match in the presence of occlusion, clutter, and noise. However, existing 3D algorithms for calculating the Hausdorff are computationally intensive, making them impractical for pattern recognition that requires scanning of large databases. The present invention is directed to a new method that can efficiently, in time and memory, compute the Hausdorff for 3D range imagery. The method uses a window-based approach.

8 Claims, 5 Drawing Sheets

(a)

(b)

WINDOW-BASED METHOD FOR APPROXIMATING THE HAUSDORFF IN THREE-DIMENSIONAL RANGE IMAGERY

CROSS-REFERENCE TO RELATED APPLICATION

This application claims the benefit of U.S. Provisional Application No. 60/688,886, filed Jun. 8, 2005, which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to pattern recognition and, in particular, to window-based method for approximating the Hausdorff in three-dimensional range imagery.

BACKGROUND OF THE INVENTION

A goal of three-dimensional (3D) pattern recognition is to recognize objects, such as faces or vehicles, in 3D range imagery. The central problem in 3D pattern recognition is to determine the extent to which one shape differs from another.

For example, facial recognition (FR) is an appealing biometric for many applications because of its non-intrusive nature, ease of integration into existing systems, and potential to identify individuals at a distance without the individual's cooperation. These attributes make the technology ideal for the screening of individuals at borders, airports, secure facilities, etc. Most of the current efforts in FR use a two-dimensional (2D) representation of the face. While much progress has been made over the last decade, 2D FR systems are not generally robust to variations such as facial pose, scene lighting, and facial expression. In addition, the task of positive identification becomes increasingly difficult when confronted with large numbers of people to screen. See R. Chellappa Zhao et al., "Face Recognition: A Literature Survey," *CVL Technical Report*, University of Maryland, October 2000; and P. J. Phillips et al., "Face Recognition Vendor Test 2002: Evaluation Report," http://www.frvt.org/DLs/FRVT_2002_Evaluation_Report.pdf.

To overcome many of the limitations associated with 2D FR technology, researchers are beginning to examine the benefits of 3D data for the FR task. 3D FR systems are expected to be less sensitive to lighting and facial pose variations. In addition, the geometric information available is thought to provide more discriminatory features for facial recognition, including size information which is lacking in most 2D approaches. See K. W. Bowyer et al., "A survey of approaches to 3D and Multi-modal 3D+2D face recognition," *Int. Conf. on Pattern Recognition*, August, 2003.

Despite this, many 3D data sets have attributes that present challenges for 3D FR algorithms. For instance, corresponding areas of the face may not always be available over multiple scans due to facial pose variation and object self-occlusion. Also, incorrect or missing data regions may occur due to sensor drop-outs and/or sensor noise characteristics. Variations in datasets acquired of the same individual due to changes in facial expression, hairstyle, glasses, etc. also present a challenge. In many cases, the ability to handle these data issues can be more important than the underlying algorithm used for recognition. For this reason, 3D algorithms must be robust to these types of variations. In addition, the large number of faces in real world databases makes computationally intensive algorithms impractical for scanning entire databases. This is especially true for 3D facial recognition systems, as they tend to use more complex algorithms than the traditional 2D approaches to handle 3D rotation and translation.

One approach to pattern recognition is to use a template from a database of objects and match it to a probe image containing the unknown. Mean square error can determine the goodness of the match. However, this approach fails for an obscured object, or if the probe image has excess clutter. See Besl, P. J., and N. D. McKay, "A Method for Registration of 3-D Shapes," *IEEE Transactions on Pattern Analysis and Machine Intelligence* 14(2), 239 (1992).

Alternatively, the Hausdorff distance can be used to measure the similarity of two sets of points. In particular, the Hausdorff can measure the goodness of a match in the presence of occlusion, clutter, and noise. The Hausdorff distance measures the extent to which each point of a template object set lies near some point of a probe image set and vice versa. Thus, the distance can be used to determine the degree of resemblance between two objects that are superimposed on one another. See D. P. Huttenlocher et al., "Comparing Images using the Hausdorff Distance," *IEEE Transactions on Pattern Analysis and Machine Intelligence* 15(9), 850 (1993), and D. P. Huttenlocher et al., "View-Based Recognition using an Eigenspace Approximation to the Hausdorff Measure," *IEEE Transactions on Pattern Analysis and Machine Intelligence* 21(9), 951 (1999), which are incorporated herein by reference. However, existing 3D algorithms for calculating the Hausdorff are computationally intensive, making them impractical for pattern recognition that requires scanning of large databases.

SUMMARY OF THE INVENTION

The present invention is directed to a window-based method that can efficiently, in time and memory, compute the Hausdorff for 3D range imagery. The method comprises providing a template data set of a 3D object, providing a probe data set of a 3D image, computing a template range image from the template data set, computing a probe range image from the probe data set, representing a set of coordinates of points in a window, centering the window at a point of the probe range image, and for each such point finding the distance of the closest corresponding point in the probe range image. The two data sets can be preregistered. The window-based method can be used to approximate a directed Hausdorff distance, an undirected Hausdorff distance, or a Hausdorff fraction. In particular, the method can be used for facial recognition.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIG. 1(a) shows sets A and B, which can be preregistered. FIG. 1(b) illustrates dotted ellipses showing pairings for each point in A and the closest point in B. The largest distance for the pairings is the directed Hausdorff h(A,B).

DETAILED DESCRIPTION OF THE INVENTION

The Hausdorff distance was originally designed to match binary edge images. See D. P. Huttenlocher et al., (1993). Modifications to the Hausdorff distance permit it to handle not only noisy edge positions, but also missing edges from occlusion, and spurious edges from clutter noise. See D. P. Huttenlocher et al., (1999). In edge image matching, an edge image can be conceptualized as a list of 2D points, where the points indicate the location of an edge. This concept can be generalized to 3D datasets where a list of 3D points is available.

For instance, let $A=\{a_1, \ldots, a_P\}$ represent the set of P points for the database template. For edge images, $a_i$ is a 2×1 column vector representing the (x, y) coordinate of the $i^{th}$ edge point in the template, and for 3D images $a_i$ represents a 3×1 column vector corresponding to 3D points located on the object. Similarly, let $B=\{b_1, \ldots, b_Q\}$ represent the set of Q points for the probe image. In general, the template and probe image data sets can be preregistered by finding a translation and/or rotation that optimally aligns the two data sets.

The following equation gives the directed Hausdorff distance from A to B, h(A,B):

$$h(A, B) = \min_{a \in A} \min_{b \in B} \|a - b\| \quad (1)$$

where $\|\cdot\|$ represents the distance between points a and b measured by some norm, for example the Euclidean norm $L_2$. The computation of the Hausdorff distance can be broken down into two steps:

$$d_1(a, B) = \min_{b \in B} \|a - b\| \text{ and} \quad (2)$$

$$h(A, B) = \max_{a \in A} d_1(a, B) \quad (3)$$

The first step, Eq. (2), takes a point $a \in A$ and finds the closest point in B. The corresponding distance is called $d_1(a, B)$. In the second step, Eq. (3), the directed Hausdorff, h(A, B), gives the largest distance $d_1(a, B)$ for all points $a \in A$. That is, h(A, B) in effect ranks each point of A based on its distance to the nearest point of B and then uses the largest ranked such point as the Hausdorff distance (the most mismatched point of A). Therefore, each point of A must be within distance h(A, B) of some point of B, and there also is some point of A that is exactly distance h(A, B) from the nearest point of B (the most mismatched point). Accordingly, the directed Hausdorff is small, if every point in A is near some point in B.

Figure 1:
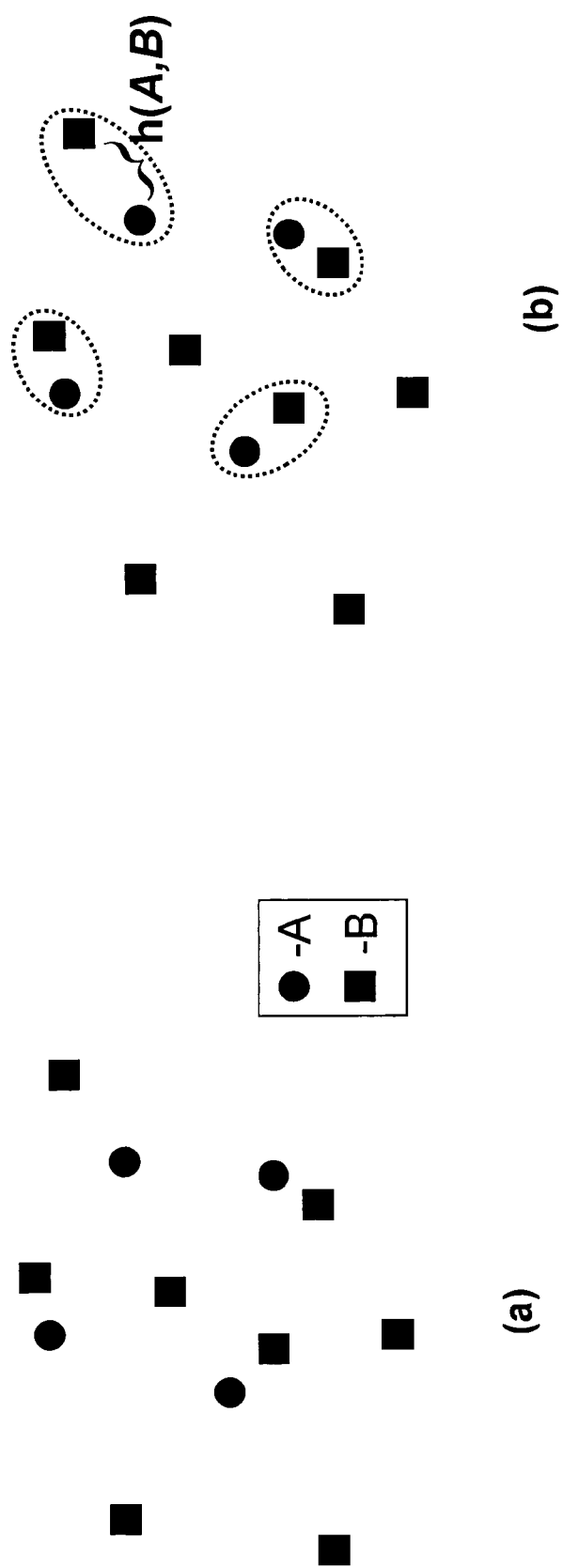
FIG. 1 shows a two-dimensional example of the computation of the directed Hausdorff. The circles represent points from the template A, and the squares represent points from the probe B.

In FIG. 1 is shown a simple 2D example of the computation of the directed Hausdorff. The circles represent points from the template A, and the squares represent points from the probe image B. In FIG. 1(a) is shown sets A and B, which can be preregistered. The first step in determining the directed Hausdorff finds for each point in A the closest point in B. The dotted ellipses shown in FIG. 1(b) denote this pairing. The second step looks at the distance for each pairing and determines the largest distance. This largest distance is the directed Hausdorff h(A, B).

In many pattern recognition applications, it is desired to compare a template object to a probe image, wherein a portion of the template is obscured. The following equation gives a generalized Hausdorff distance for handling partial obscurations and clutter:

$$h_K(A, B) = K^{th}_{a \in A} \min_{a \in A} \|a - b\|. \quad (4)$$

where $$K^{th}_{a \in A}$$

denotes the $K^{th}$ ranked value in the set of distances (one corresponding to each element of A). That is, for each point of A, the distance to the closest point of B is computed, and then, the points of A are ranked by their respective values of this distance. Therefore, Eq. (4) uses the $K^{th}$ rank pairing instead of the largest one. This rank pairing allows a certain number of points from the template A to be obscured and not have a matching point from the probe B. Thus, the generalized Hausdorff distance measures the difference between a portion of the template and the image.

An alternative formulation to Eq. (4) that does not require a partial sort computes a directed Hausdorff fraction $\phi(A, B)$:

$$\phi(A, B) = \frac{\sum_{a \in A} \chi_D\left(\min_{b \in B} \|a - b\|\right)}{|A|}. \quad (5)$$

Here, D represents the largest acceptable Hausdorff distance and $|\cdot|$ represents cardinality or the counting operation. The function $\chi_D(x)$ is an indicator function:

$$\chi_D(x) = \begin{cases} 1 & \text{if } x \leq D \\ 0 & \text{otherwise} \end{cases}. \quad (6)$$

Thus, for each point in set A, the closest point in is found and the number of distances less than the threshold D is counted. That count is then divided by the number of points in the set A. This gives the fraction of points from A within a certain distance of points from B. Therefore, the Hausdorff fraction is a measure of the correspondence of sets A and B.

The directed Hausdorff distance h(A, B) is not symmetrical, thus h(A, B) does not always equal h(B, A). One can view h(A, B) as a hypothesis generation step. The function h(B, A)

can then be viewed as a verification step, if one limits the extent of B to some size of A. The limited extent is usually taken to be a bounding box around the points in A. This reduces mismatches caused by other objects or clutter in the image containing the probe B. Using a limited extent, the undirected Hausdorff distance H(A, B) is defined as max(h(A, B), h(B, A)). Therefore, the undirected Hausdorff distance H(A, B) is the maximum of h(A, B) and h(B, A). It measures the degree of mismatch between two sets by measuring the distance of A that is farthest from any point of B and vice versa. Thus, small distances are required for both the hypothesis and verification for point set A to match point set B. In a similar way, we can define the undirected Hausdorff fraction $\Phi(A, B)$ as $\min(\phi(A, B), \phi(B, A))$.

3D Representation and Space Complexity

Representation of 3D data is usually determined by the types of algorithms used to process the data and the memory requirements for the data structures. Different data representations impact the computation of the Hausdorff distance differently. For example, consider the point cloud, range image, and voxel representations.

The point cloud representation creates a list of the 3D points and their coordinates. Assuming 4 bytes to represent a floating point coordinate and 640×480 points (i.e., a typical size of a range image for facial recognition), the point cloud representation requires at most 3.5 MB of memory. The number of points can be reduced by segmenting out the object of interest or not including invalid points (points too far away), and thus reducing the amount of memory needed in the point cloud representation. The function $O(\bullet)$, or order function, represents the asymptotic space or time complexity of the data representation or algorithm. Therefore, 3D coordinates can be represented, using the point cloud representation, at the accuracy of a 3D image sensor using quadratic space complexity for the Hausdorff of $O(n^2)$.

The range image representation stores the depth of each point in a 2D image array. Each (x, y) coordinate in 3D space is mapped to an integer (i, j) index. The mapping requires some quantization of the (x, y) coordinates, and will typically depend on the parameters of the matching function and the resulting range image size. A reduced memory representation is achieved for a slight loss in accuracy, but still at $O(n^2)$ space complexity. For either the point cloud or range image representation, the memory requirements can be reduced using a fixed point representation, if the range of the data can be constrained or the representation can be normalized to the distance of the object from the 3D sensor.

The voxel representation stores a 3D image using a 3D array. Each coordinate in 3D space maps to an integer (i, j, k) index. The voxel representation has a cubic space complexity $O(n^3)$. Each array element contains a "1" or a "0" indicating whether there exists a (x, y, z) coordinate that maps to the corresponding (i, j, k) index or not, respectively. Each voxel can be represented with one bit. Unfortunately, a voxel distance transform image has a large memory requirement. Therefore, the cubic space complexity $O(n^3)$ causes a large increase in storage requirements as the 3D resolution (i.e., the number of voxels per cm) is increased.

Hausdorff Computation and Time Complexity

The speed of computing the Hausdorff distance depends on the representation used to store the 3D data. Using the point cloud representation, the Hausdorff fraction (Eq. (5)) can be computed with quadratic time complexity $O(n^2)$, where it is implicitly assumed that P and Q (the number of points in A and B) grow at the same rate. The quadratic time complexity results from having to find the closest point in B for every for point in A.

A faster Hausdorff distance computation time of $O(n)$ can be obtained using the voxel representation. The reduced time complexity requires using a distance transform (DT) that can be computed in linear $O(n)$ time. See C. R. Maurer, "A Linear Time Algorithm for Computing Exact Euclidean Distance Transforms of Binary Images in Arbitrary Dimension," *IEEE Transactions on Pattern Analysis and Machine Intelligence* 25(2), 265 (2003). A DT of a voxel image is a new voxel image where every voxel gives the distance to the closest voxel containing a 3D point or a "1". In Table 1 is shown an example of a 2D voxel image. In Table 2 is shown the corresponding DT. In the DT image, the numbers correspond to square $L_2$ norm values. To compute the Hausdorff fraction, a DT of the probe image B is computed first. Using the coordinates of A as an index into the DT of B, the distance to the closest voxel in B is found. The number of the distances less than the threshold D is counted and this number is divided by the total number of points in A to obtain the Hausdorff fraction $\phi(A, B)$. This approach gives the overall Hausdorff calculation a time complexity of $O(n)$. Unfortunately, as noted above, the voxel distance transform image has cubic space complexity $O(n^3)$ and, therefore, has a large memory requirement.

TABLE 1

2D "voxel" image

| 0 | 0 | 0 | 1 | 1 | 1 | 0 | 0 | 0 |
| 0 | 1 | 1 | 0 | 0 | 0 | 1 | 1 | 0 |
| 0 | 1 | 0 | 0 | 0 | 0 | 0 | 1 | 0 |
| 1 | 0 | 0 | 0 | 0 | 0 | 0 | 0 | 1 |
| 1 | 0 | 0 | 0 | 0 | 0 | 0 | 0 | 1 |
| 1 | 0 | 0 | 0 | 0 | 0 | 0 | 0 | 1 |
| 0 | 1 | 0 | 0 | 0 | 0 | 0 | 1 | 0 |
| 0 | 1 | 1 | 0 | 0 | 0 | 1 | 1 | 0 |
| 0 | 0 | 0 | 1 | 1 | 1 | 0 | 0 | 0 |

TABLE 2

Distance transform of 2D voxel image

| 2 | 1 | 1 | 0 | 0 | 0 | 1 | 1 | 2 |
| 1 | 0 | 0 | 1 | 1 | 1 | 0 | 0 | 1 |
| 1 | 0 | 1 | 2 | 4 | 2 | 1 | 0 | 1 |
| 0 | 1 | 2 | 5 | 8 | 5 | 2 | 1 | 0 |
| 0 | 1 | 4 | 8 | 13 | 8 | 4 | 1 | 0 |
| 0 | 1 | 2 | 5 | 8 | 5 | 2 | 1 | 0 |
| 1 | 0 | 1 | 2 | 4 | 2 | 1 | 0 | 1 |
| 1 | 0 | 0 | 1 | 1 | 1 | 0 | 0 | 1 |
| 2 | 1 | 1 | 0 | 0 | 0 | 1 | 1 | 2 |

Window-Based Method for Approximating the Hausdorff

The 2D range Hausdorff algorithm of the present invention uses a local neighborhood or window-based approach to compute the Hausdorff. By using the range image representation to approximate the Hausdorff distance, linear time complexity along with reduced memory requirements can be obtained. This improvement is possible because, for smooth objects, close points in the (x, y) plane also tend to be close in (x, y, z) space. Let the set of points in A and B now be represented by the range images A and B respectively. Accordingly, the set of points in A (or B) are mapped onto a grid with integral spacing in A (or B). See Russ et al., "A 2D Range Hausdorff Approach for 3D Face Recognition," *IEEE Face-Recognition Grand Challenge Experiment Workshop* (2005), which is incorporated herein by reference. Therefore, for the set of positive integers I and a two-dimensional index $p \in I^2$, $A(p)$ gives the range value (z-coordinate) for the column vector $p=[i_p, j_p]'$. Thus, for $a_p=\lfloor x_p, y_p, z_p \rfloor' \in A$, $A(p)=z_p$ gives an appropriate quantization mapping (scaling and translation) of $[x_p, y_p]'$ into $p=[i_p, j_p]'$. For two range images A and B, an approximation to finding the closest point in B to A(p) computes the distances within a window of size w centered around B(p) and selects the minimum distance.

Thus for a range image, to find the closest point in set B to range image $A(i_p, j_p)$, we need to compute distances within a window of size w centered around range image $B(i_p, j_p)$. This can be accomplished using a distance kernel k. In Table 3 is shown the distance kernel for a window of size w=5. Each entry of the distance kernel is the square $L_2$ norm to that entry's position from the center of the distance kernel. Therefore, linear time complexity is achieved because the neighborhood size is constant and independent of the number of points in B (it only grows with the number of points in A).

TABLE 3

Distance kernel k for window of size w = 5

| 8 | 5 | 4 | 5 | 8 |
|---|---|---|---|---|
| 5 | 2 | 1 | 2 | 5 |
| 4 | 1 | 0 | 1 | 4 |
| 5 | 2 | 1 | 2 | 5 |
| 8 | 5 | 4 | 5 | 8 |

To find the closest point in B to $p=[i_p, j_p]'$ in the template range image A, the range value stored at p of the template range image A(p) is taken and the distance kernel is centered on top of the p point in the probe range image B. Let W represent the set of coordinates of the points in a window of the kernel k, $W=\{(u, v) | u=1, \ldots w, v=1 \ldots W\}$ and $W_p$ represent the set of coordinates of the points in the window when it is centered at p, $W_p = W+p-(1+\lfloor w/2 \rfloor)$, where $\lfloor \cdot \rfloor$ is the floor operator. Thus $q \in W_p$ represents the range point indicies from range image B within the window W centered at point p and similarly $i \in W$ represents the indices from the kernel k. The function $$d_1(a, B) = \min_{b \in B} \|a - b\|$$

in the Hausdorff (Eq. (2)) can be approximated according to:

$$d_1(a, B) \approx d_W(a_p, B) = \min_{q \in W_p} \|a_p - b_q\|. \quad (7)$$

Here the 3D point $a_p$ can be determined from the range image as $a_p=[i_p, j_p, A(p)]$ and similarly $b_q=[i_q, j_q, B(q)]$. In terms of the distance kernel k, $d_W(a_p, B)$ is computed as:

$$d_W(a_p, B) = \min_{i \in W} \lfloor (A(p) - B(p+i-1-\lfloor w/2 \rfloor))^2 + k(i) \rfloor. \quad (8)$$

This operation has constant time complexity O(1), since $S=|W|=w^2$ is constant and independent of the number of points B. The quantity $$\min_{b \in B} \|a - b\|$$

has linear time complexity O(n) and grows at the rate of the number of points in A. Thus, the time complexity for the Hausdorff distance using the range image representation and the distance kernel is linear O(n).

The window-based Hausdorff fraction approximates the true Hausdorff fraction. The approximation error was empirically estimated by matching 3D faces using the window-based Hausdorff for range imagery and computing the Hausdorff exactly from the point cloud representation. The performance was demonstrated using the Collection D of the University of Notre Dame's 3D face imagery from a 100 people with 2 images per face. See K. K. Chang et al., "Face Recognition using 2D and 3D Facial Data," *ACM Workshop on Multimodal User Authentication*, 25 (2003); and P. J. Flynn et al., "Assessment of Time Dependency in Face Recognition: An Initial Study," *Audio and Video-Based Biometric Person Authentication*, 44 (2003). One face was picked as the template and the other as the probe image. The threshold used to compute the Hausdorff fraction according to Eq. (5) was $D=\sqrt{3}$. The window size was w=5.

Figure 2:
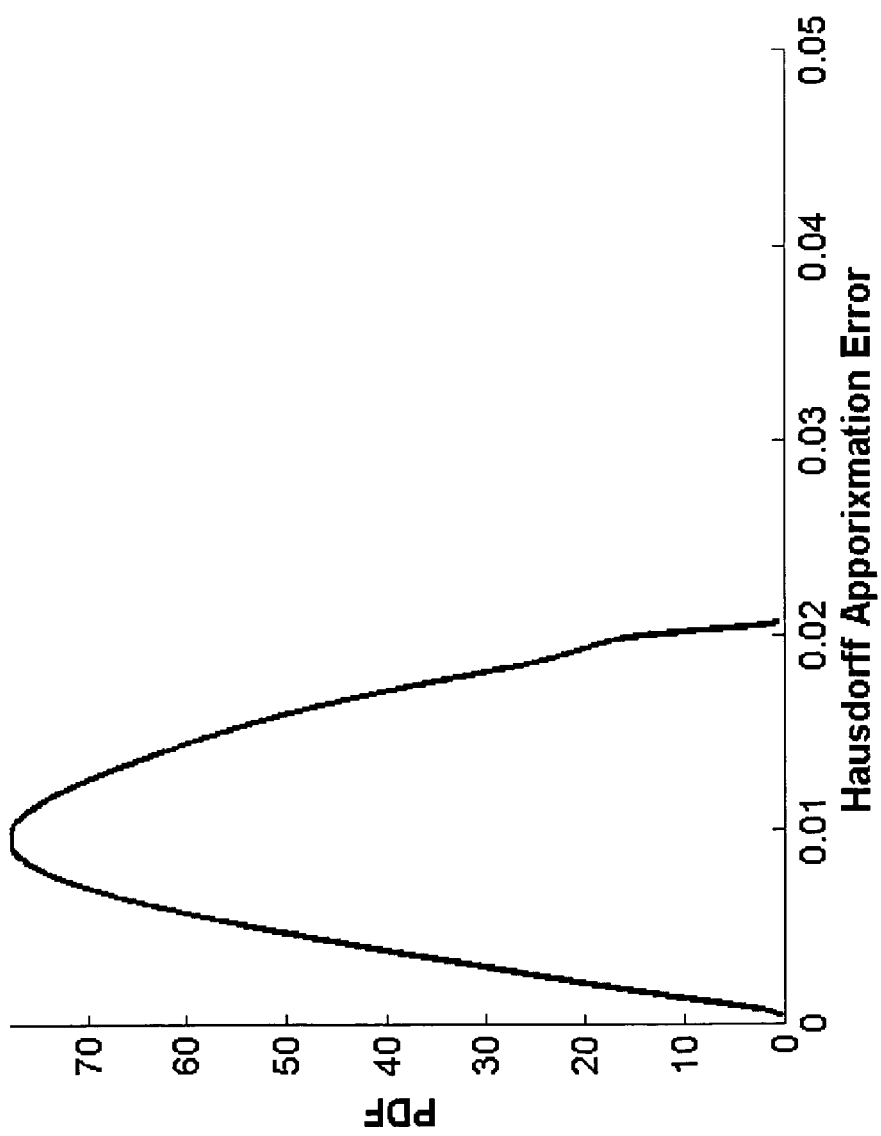
FIG. 2 shows a graph of the differences, obtained using Parzen density estimation, between the window-based approximation of the Hausdorff and the actual Hausdorff fraction.

In FIG. 2 is shown the distribution of differences, obtained using Parzen density estimation, between the window-based approximation of the Hausdorff and the actual Hausdorff fraction. The errors are very small, with the largest error being 0.021. The errors are always positive, indicating that the window based Hausdorff always over-estimates the true Hausdorff fraction.

Therefore, the standard 3D formulation of the Hausdorff matching algorithm can be modified according to the present invention to operate on 2D range images, enabling a reduction in computation from $O(n^2)$ to $O(n)$ while avoiding the storage requirements of the $O(n^3)$ voxel array required to achieve O(n) performance using the distance transform. In general, the window-based method for approximating the Hausdorff can be used with any 3D range imagery pattern recognition problem. The method is particularly useful for facial recognition, as illustrated in the example described below.

Application of the Window-Based Method for Approximating the Hausdorff to Facial Recognition 2D Range Hausdorff Matching The Hausdorff distance is an appropriate choice for matching 3D faces obtained from conventional 3D sensors, since it is robust to data outliers and inconsistencies between data sets. However, as described above, the computational of the traditional Hausdorff requires either quadratic time complexity (with the point cloud representation) or large memory requirements (with the voxel representation). The distance transform approach enables a reduction in the computation time with the voxel representation. However, storage of a 15×18×12 cm face at 0.025 cm resolution would require a 600×720×480 integer voxel array (207,360,000 integers). Furthermore, space complexity can quickly become unreasonable as the 3D resolution increases. In addition, the voxel array would either need to be stored as the face representation or computed for the enrollment image each time a match is performed. This makes it difficult to fine tune the facial registration, an important feature for discriminating between similar looking faces.

The window-based approximation of the Hausdorff using the distance transform can be applied to 2D range images of human faces. The 2D range Hausdorff significantly reduces computation time while maintaining minimal storage requirements.

Local Neighborhood Hausdorff Metric

A local neighborhood Hausdorff metric was used to enable fine-tuning of the initial facial data registration, to reduce the time associated with finding the minimum error between data points, and to provide discriminators for the facial recognition task. Instead of searching the whole data set B to find the minimum error to a as defined in the traditional Hausdorff algorithm, a local neighborhood W was defined. The local window Hausdorff fraction is defined as:

$$\phi(A, B) \approx \frac{\sum_{a_p \in A} \chi_D(d_W(a_p, B))}{|A|}. \quad (9)$$

The local window Hausdorff fraction in Eq. (9) provides an indication of the correspondence of two datasets. For instance, the ratio of points in set B within distance D of points in A are determined.

2D Range Registration and Matching

For optimal performance, the matching algorithm assumes a good initial registration between probe and template datasets. However, to minimize the error between two patterns, the registration can be iteratively refined. An iterative refinement enables the fine-tuning of the alignment between two faces that can benefit the face recognition algorithm. Therefore, a matching algorithm used an iterative registration procedure similar to the iterative closest point (ICP) algorithm. See P. Besl and N. McKay, "A method for registration of 3d shapes", *IEEE Trans. Pattern Analysis and Machine Intelligence* 14(2), 239 (1992). This procedure eliminates the sensitivity of the final match result on the quality of the initial alignment. Accordingly, the matching algorithm iteratively refines the alignment of B to maximize the Hausdorff fraction. Thus, in computing the neighborhood Hausdorff fraction using Eq. (7), a set of correspondences are obtained in range images A(p) and B(q) that are used to refine the alignment of B with A.

After a set of corresponding points are obtained, the least square transform (includes rotation and translation) is computed using the corresponding points within error distance D. This transform is applied to a scaled version (i.e., quantization mapping) of the coordinates in B. This scaled coordinate system is used to facilitate the generation of range image B. Subsequently, a new range image is generated for the set of points in B, and corresponding points are recomputed. The procedure is iteratively performed until no significant improvement is observed in Eq. (9) or a maximum number of iterations S has been reached. A Hausdorff fraction less than 0.5 typically indicates a bad alignment. Usually the alignment problem can be resolved by temporarily increasing D to the median of the set of best distances.

Figure 3:
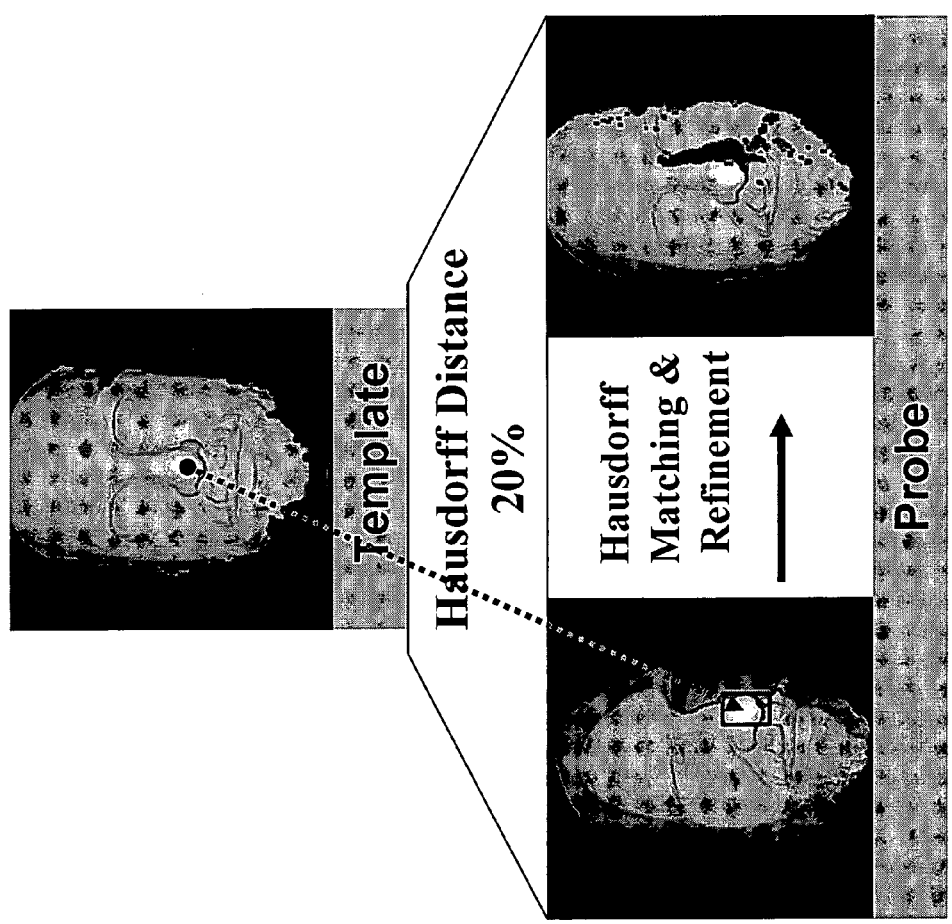
FIG. 3 illustrates the before and after results of applying a facial registration procedure that uses a 2D range Hausdorff algorithm to iteratively refine a probe image to match a template.

In FIG. 3 is shown a graphic that illustrates the before and after results of applying this registration procedure. The procedure starts with a template or gallery image and the probe image is iteratively refined to best match the template.

Range Image Mapping

A range image is easily generated from a 3D point cloud by applying a standard linear mapping that scales the 3D points such that point (x, y, z) is transformed to [i, j, k]' where p=[i, j]' specifies an image pixel location and k its associated depth value. A linear scaling of the 3D coordinates is computed for each dimension with a consistent scale factor γ. This scale factor determines the resolution of the range image. The scale factor γ and the predefined image size n×m are very important as they will determine the image resolution or the number of image points that will be occupied by a unique pixel in the image plane. When multiple points map to the sample pixel [i, j], the one closest to the camera (i.e., minimum depth) occupies the pixel (i.e., no averaging or interpolation is performed).

Multi-Resolution Analysis

To accommodate larger rotation and translation updates defined in the 2D range Hausdorff algorithm, without incurring the computational cost associated with using large local windows $W_p$ (defined by w), multiresolution analysis was employed. See R. Jain et al., *Machine Vision*, McGraw Hill, Bost, Mass., (1995). Here, the image at level l represents sampling the original image at a rate $2^{l/s}$. Thus, searching for correspondences at lower resolutions approximates using larger window sizes and requires the correspondence of fewer points.

To successfully apply this technique to the FR matching algorithm, consideration must be given to the impact of multiresolution analysis on the rotation of the scaled 3D coordinates. It turns out that rotation at one resolution can be represented by a similarity transform of the rotation matrix at a different resolution. This can be understood by observing the following set of equations, where $p_0$ is a point at resolution 0 (default resolution), $p_l$ is a point at resolution level l, $S_l$ is a diagonal scaling matrix, R is the rotation matrix for the default resolution point set, and $R_l$ is the rotation matrix for the scaled point set.

$$p_0 = Rp_0 \text{ and } p_l = S_l p_0 \quad (10)$$

$$p_l = S_l p_0 \text{ and } p_l = R_l p_l = R_l S_l p_0 \quad (11)$$

$$p_0 = S_l^{-1} R_l S_l p_l \quad (12)$$

$$R = S_l^{-1} R_l S_l \quad (13)$$

Eqs. (10) and (11) use the properties of rotation and scaling applied to both a default resolution point and a point at level l. Eq. (12) then combines Eqs. (10) and (11) to realize the default resolution rotation in terms of the lower resolution rotation as shown in Eq. (13). Keeping track of the default resolution rotation means that rotated data points will be correct as one performs the point set registration down the resolution pyramid. Note that the termination criterion described above for 2D range registration only applies to a single resolution level. Thus, all resolution levels are visited despite termination at an earlier level. A beneficial attribute of multi-resolution analysis is that matching results are obtained at reduced resolutions; therefore, the impact of using fewer data points can be evaluated.

Experimental Analysis

The analysis method of the presented system was performed for 3D facial verification and identification on a single probe database. The 3D facial images used in the following analysis were from the Facial Recognition Grand Challenge database version 1.0 (FRGC v1.0). See Face Recognition Grand Challenge Website, http://www.frvt.org/FRGC. This database consists of images of 200 subjects acquired in the spring of 2003. Of the 200 subjects, 198 participated in more than one session, allowing the first image to be used as a template image (gallery or enrollment image) and subsequent acquisitions to be used as a probe image (test image against the gallery). For this analysis, only a single probe database was used. Thus, the first acquired image was used as the enrollment image and the next acquired image was used as the probe image. Only the 198 subjects that participated in more than one session were examined and each probe image was compared to each gallery image resulting in 39,204 matches that were computed. The Hausdorff fraction (Eq. (9)) was used as a metric to evaluate the utility of the 2D range Hausdorff algorithm for registration and matching.

The images in the FRGV database were acquired with a Minolta Vivid 900 range scanner, which uses a projected laser stripe to acquire triangulation-based range data. The scanner acquires a color image nearly simultaneous with the range image, producing a 640×480 array of 3D points and a registered 640×480 color image. The color image is not used for this matching algorithm.

Face Segmentation and Alignment

Prior to applying the Hausdorff algorithm, the faces were segmented to remove non-face regions, such as clothing. This was achieved by applying a 3D spherical mask to the face with the center at a manually identified nose location. Subsequently, remaining regions were grouped using a 3D point clustering algorithm based on point distances and surface characteristics. The largest cluster was selected as the facial region of interest. In the datasets analyzed, each image contained a single subject making this approach realistic for the data analyzed.

The matching algorithm described above assumes an initial alignment of two face datasets. This initial alignment was determined by the registration of five facial features: the nose tip, sellion (the deepest depression at the top bridge of the nose), inner eye corners, and center of the mouth. For each dataset in FRGC v1.0, these facial features were detected manually. The least squares rotation was computed to best align features in set B with features in set A. Subsequently, the 2D range Hausdorff algorithm is computed to fine-tune the registration and maximize the Hausdorff fraction.

System Parameters

For the 2D range Hausdorff algorithm, a range image of size 320×240 was generated using the scale factor $\gamma=0.9$ mm/pixel. Most facial datasets initially consisted of 30,000 to 50,000 segmented facial points. After mapping to a range image, approximately 25,000 to 35,000 are projected onto a unique pixel. For the following experiments, the threshold distance D used in the Hausdorff fraction is 2.97 mm and a maximum of 20 iterations are used to fine-tune the registration of the face sets. To enable efficient searches of larger image regions, multi-resolution analysis was performed. At each resolution level, the image is subsampled by $2^{l/s}$ where s=2 and the maximum l is 3.

Facial Verification Results

The verification task mimics the access control scenario where an authorized individual is seeking access to a secure facility and presents to the system his or her identity. The enrollment data for this individual is then acquired and compared to an immediate acquisition of the individual. If the similarity is great enough the subject is granted access to the facility. The verification task must allow for the case when unauthorized users may seek access to the facility and therefore must be selective enough to allow access of authorized users while denying access of unauthorized users.

Verification is performed by selecting a single threshold that determines if two face datasets have a low enough match score to be considered the same subject. In this case, it is important to examine the probability of correct verification (or false reject rate) in conjunction with the false accept rate. This is often shown with a Receiver Operating Characteristic (ROC) curve that graphs the probability of correct verification versus the false accept rate. See P. J. Phillips et al.

Figure 4:
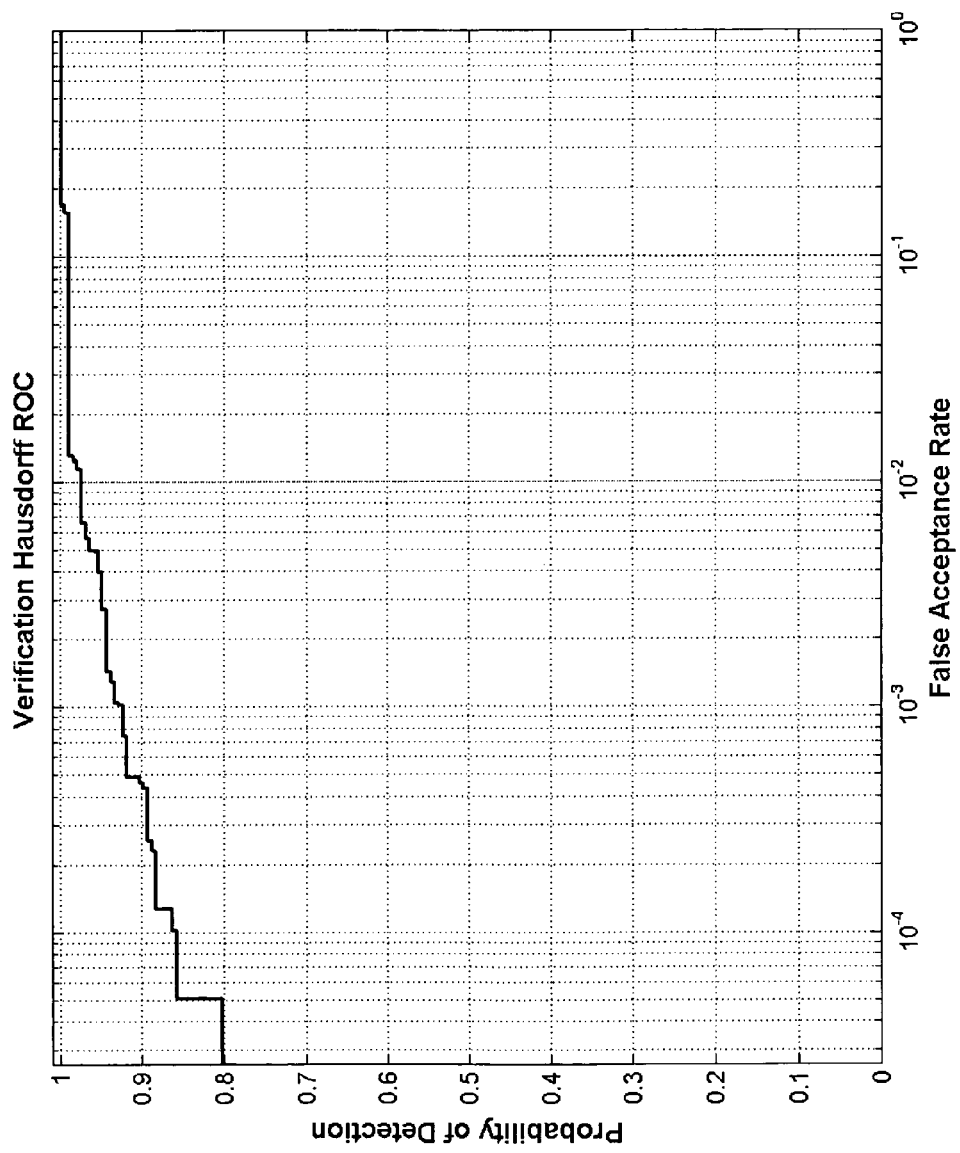
FIG. 4 shows the Receiver Operating Characteristic (ROC) curve for the Hausdorff fraction, with a maximum Hausdorff distance of D=2.97, that was calculated using the window-based Hausdorff distance.

In FIG. 4 is shown the ROC curve for the Hausdorff fraction. The Hausdorff fraction achieves a verification rate of 92% with a false accept rate of 0.1%

Facial Identification Results

In the identification scenario, an authorized user is searched for in a database of many individuals and the system must determine the user's identity. The identification task looks for the best match and results in a probability of recognition or identification. In real systems, the utilization of a detection threshold may also be useful to ensure that a match is not returned when a viable match is not available. The following analysis guarantees that a match always exists.

Results for facial identification are often displayed using a cumulative rank curve. See P. J. Phillips et al. This curve displays the probability of identification if the top K match results were returned. This provides an indication of how close one may be to getting the correct match if the rank one match was incorrect. In a real world system, the top K matches can be given to security personnel who will make the final match decision.

Figure 5:
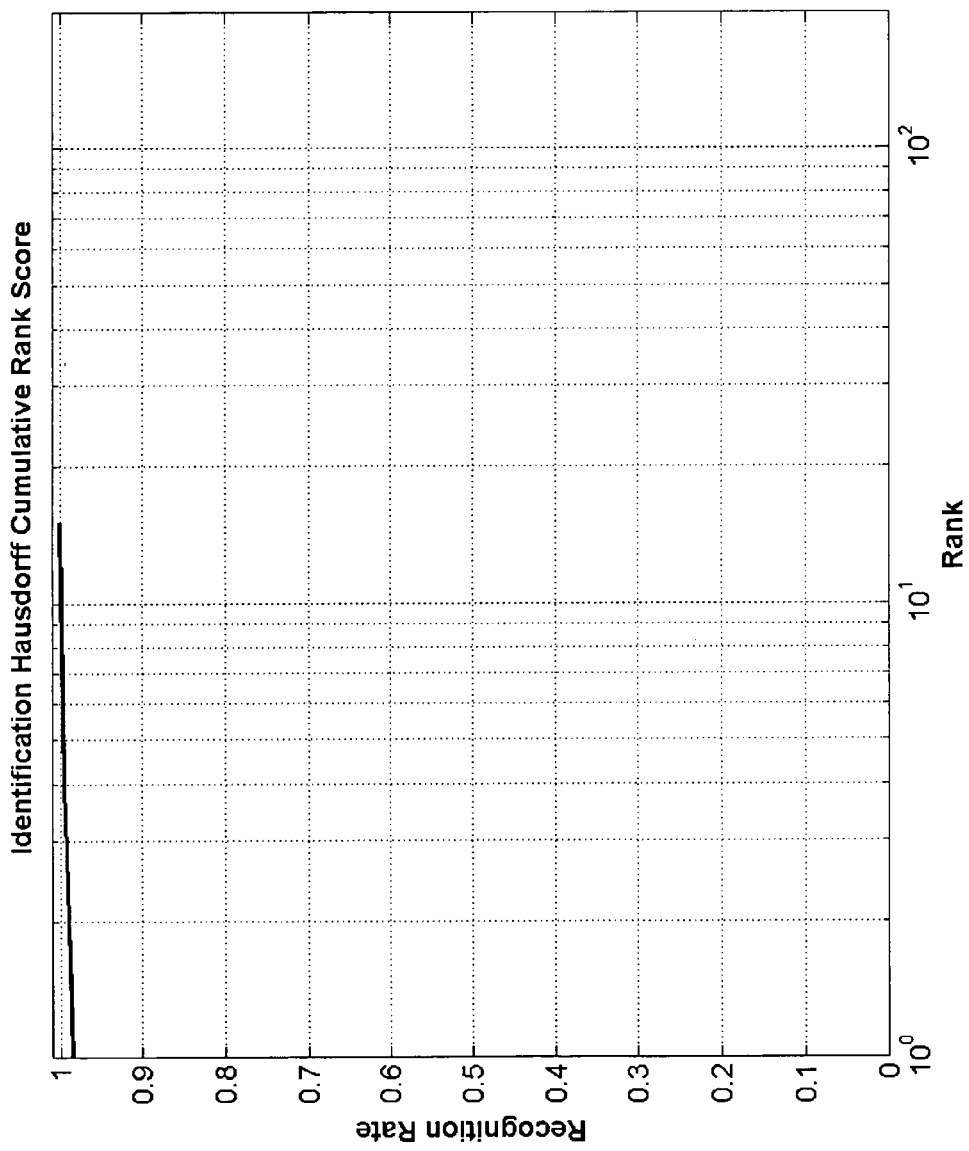
FIG. 5 shows cumulative rank curves for the Hausdorff fraction.

In FIG. 5 is shown the cumulative rank curve using the Hausdorff fraction for facial identification. The Hausdorff fraction has a rank one recognition rates of 97.47%. In addition, the Hausdorff fraction achieves 100% recognition at rank 12. This result is better than the 94.5% rank one detection rate that has been reported for 3D Principal Component Analysis (PCA). See K. Change et al., "Face Recognition using 2D and 3D facial data," ACM Workshop on Multimodal User Authentication," pp. 25-32, (2003).

The present invention has been described as a window-based method for approximating the Hausdorff in three-dimensional range imagery. It will be understood that the above description is merely illustrative of the applications of the principles of the present invention, the scope of which is to be determined by the claims viewed in light of the specification. Other variants and modifications of the invention will be apparent to those of skill in the art.

I claim:

1. A method for three-dimensional (3D) range imagery, comprising:

a) providing a template data set $A=\{a_1, \ldots, a_P\}$ wherein $a_i$ comprises a 3×1 column vector representing the $(x_i, y_i, z_i)$ coordinate of the $i^{th}$ point of P points located on a 3D object;

b) providing a probe data set $B=\{b_1, \ldots, b_Q\}$ wherein $b_i$ comprises a 3×1 column vector representing the $(x_i, y_i, z_i)$ coordinate of the $i^{th}$ point of Q points located on a 3D image;

c) computing a template range image $A(p)=z_p$ by quantization mapping $[x_p, y_p]'$ of the set A into an index represented by column vector $p=[i_p, j_p]'$ wherein $i_p$ and $i_p$ are positive integers and $z_p$ is the range value (z-coordinate) for p;

d) computing a probe range image $B(q)=z_q$ by quantization mapping $[x_q, y_q]'$ of the set B into an index represented by column vector $q=[i_q, j_q]'$ wherein $i_q$ and $i_q$ are positive integers and $z_q$ is the range value (z-coordinate) for q;

e) representing a set of coordinates of points in a window of size w, according to $W=\{(u, v)|=1, \ldots w, v=1 \ldots w\}$ for a distance kernel k wherein u and v determine the entries for k that are the square norm to that entry's position from the center of the distance kernel;

f) centering the window W at p of the probe range image B, thereby providing a set of coordinates of centered points according to $W_p$ $W+p-(1+\lfloor w/2 \rfloor)$ for each point p of the template range image $A(p)$ and wherein $W_p$ is the window W centered at p;

g) for each point p in A, finding the distance $d_W$ of the closest corresponding point q in B, according to $$d_W(a_p, B) = \min_{q \in W_p} \|a_p - b_q\|$$

wherein $d_W$ is the approximate Hausdorff distance using the window W;

h) computing a Hausdorff fraction, according to $$\phi(A, B) \approx \frac{\sum_{a_p \in A} \chi_D(d_W(a_p, B))}{|A|}.$$

where function $\chi_D(x)$ is an indicator function given by $$\chi_D(x) = \begin{cases} 1 & \text{if } x \leq D \\ 0 & \text{otherwise} \end{cases}$$

and D is a largest threshold Hausdorff distance; and i) determining if the Hausdorff fraction exceeds a threshold, thereby determining if the 3D image matches the 3D object.

2. The method of claim 1, wherein the closest distance is computed according to $$\min_{q \in W_p} \|a_p - b_q\| = \min_{i \in W} \lfloor (A(p) - B(p + i - 1 - \lfloor w/2 \rfloor))^2 + k(i) \rfloor$$

where k is the distance kernel.

3. The method of claim 1, further comprising preregistering the template data set and the probe data set.

4. The method of claim 3, wherein the preregistering comprises finding a translation that optimally aligns the data sets.

5. The method of claim 3, wherein the preregistering comprises finding a rotation that optimally aligns the data sets.

6. The method of claim 1, further comprising computing the directed Hausdorff distance, according to $$h(A, B) \approx \max_{a_p \in A} d_W(a_p, B).$$

7. The method of claim 6, further comprising computing a undirected Hausdorff distance $H(A, B)$, according to $\max(h(A, B), h(B, A))$.

8. The method of claim 1, wherein the data sets comprise facial recognition data and the 3D object comprises a first facial image and the 3D image comprises a second facial image.

* * * * *